United States Patent
Bírau et al.

(10) Patent No.: US 8,273,166 B2
(45) Date of Patent: Sep. 25, 2012

(54) PHASE CHANGE INK COMPOSITIONS AND COLORANTS FOR USE IN THE SAME

(75) Inventors: Maria Bírau, Mississauga (CA); C. Geoffrey Allen, Waterdown (CA); Biby E. Abraham, Mississauga (CA); Caroline M. Turek, Mississauga (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/008,783

(22) Filed: Jan. 18, 2011

(65) Prior Publication Data

US 2012/0180694 A1 Jul. 19, 2012

(51) Int. Cl.
*C09D 11/00* (2006.01)

(52) U.S. Cl. ............... 106/31.29; 106/31.61; 106/31.92; 106/31.64; 106/31.32; 106/31.47

(58) Field of Classification Search ..................... None
See application file for complete search history.

(56) References Cited

U.S. PATENT DOCUMENTS

| | | | |
|---|---|---|---|
| 5,195,430 A | 3/1993 | Rise | |
| 5,389,958 A | 2/1995 | Bui et al. | |
| 5,782,966 A | 7/1998 | Bui et al. | |
| 6,309,453 B1 | 10/2001 | Banning et al. | |
| 6,860,930 B2 | 3/2005 | Wu et al. | |
| 7,186,762 B2 | 3/2007 | Wong et al. | |
| 7,407,539 B2 | 8/2008 | Wu et al. | |
| 2003/0149134 A1* | 8/2003 | Modi et al. | 523/161 |

OTHER PUBLICATIONS

Surfactant science and technology, ACS National Meeting, New Orleans, Apr. 9-10, 2008.*
SciFinder Abstract for US 2003/0149134.*

* cited by examiner

*Primary Examiner* — Melvin C Mayes
*Assistant Examiner* — Yun Qian
(74) *Attorney, Agent, or Firm* — Pillsbury Winthrop Shaw Pittman LLP (57) ABSTRACT

A phase change ink compositions, comprising a novel colorant wax to prevent and/or reduce printhead and nozzle contamination in ink jet printers caused by drooling and faceplate staining. In particular, there is provided novel colorants containing acid groups for use in phase change ink compositions and which are compatible with phase change ink components.

17 Claims, 5 Drawing Sheets

PHASE CHANGE INK COMPOSITIONS AND COLORANTS FOR USE IN THE SAME

BACKGROUND

The present embodiments relate generally to phase change ink compositions, and in particular, acid colorants for use in phase change ink compositions to prevent and/or reduce printhead and nozzle contamination in ink jet printers caused by drooling and faceplate staining. Phase change ink or solid ink compositions are characterized by being solid at room temperature and molten at an elevated temperature at which the molten ink is applied to a substrate. These phase change ink compositions generally comprise an ink vehicle and a colorant, and can be used for ink jet printing.

Phase change ink or solid ink printers conventionally receive ink in a solid form, which is sometimes referred to as ink sticks. The ink sticks are typically inserted through an insertion opening of an ink loader for the printer and are moved by a feed mechanism and/or gravity toward a heater plate. The heater plate melts the phase change ink impinging on the plate into a liquid that is delivered to a printhead assembly for jetting onto a recording medium. The recording medium is typically paper or a liquid layer supported by an intermediate imaging member, such as a metal drum or belt.

A printhead assembly of a phase change ink printer typically includes one or more printheads each having a plurality of ink jets from which drops of melted phase change ink are ejected towards the recording medium. The ink jets of a printhead receive the melted ink from an ink supply chamber, or manifold, in the printhead which, in turn, receives ink from a source, such as a melted ink reservoir or an ink cartridge. Each ink jet includes a channel having one end connected to the ink supply manifold. The other end of the ink channel has an orifice, or nozzle, for ejecting drops of ink. The nozzles of the ink jets may be formed in an aperture, or nozzle plate that has openings corresponding to the nozzles of the ink jets. During operation, drop ejecting signals activate actuators in the ink jets to expel drops of fluid from the ink jet nozzles onto the recording medium. By selectively activating the actuators of the ink jets to eject drops as the recording medium and/or printhead assembly are moved relative to each other, the deposited drops can be precisely patterned to form particular text and graphic images on the recording medium.

One difficulty faced by fluid ink jet systems is that organic pigments and dyes used in the phase change inks show drooling behavior and faceplate staining in the printhead. Drooling is defined as the burst of the ink out of the printhead when pressure is applied and is expressed in differential inches water in the Low Pressure Assist cycle (LPA). Staining represents the fouling of the faceplate by the ink.

Experimental trials indicated that one approach for solving drool and staining of the faceplate by phase change inks may be through the use of colorants containing acid groups. It has been found that drooling and staining is strongly correlated to performance of the inks. However, commercially available colorants cannot be used since they exhibit a strong gelling behavior in phase change ink. Therefore, the present embodiments provide an acid colorant that can be used in phase change inks and which addresses the problems described above.

SUMMARY

According to embodiments illustrated herein, there is provided novel acid colorant for use in phase change ink compositions.

In particular, the present embodiments provide a phase change ink composition comprising: a colorant; and a wax ink vehicle, wherein the colorant is a compound having one or more functional acid groups and a N-alkyl or N-aryl counterion that is quaternary ammonium $NH_4$ or an alkyl or aryl quaternary ammonium selected from the group consisting of tetrabuthylammonium, teraoctylammonium, teradodecylammonium, tetraoctadecylammonium, N,N-dimethyl dioctadecyl, N,N-dimethyl dioctyl, N,N-dimethyl didecyl, and mixtures thereof, wherein the colorant is insoluble in water and polar organic solvents but is soluble in the wax ink vehicle.

In further embodiments, there is provided a phase change ink composition comprising: a colorant; and an ink vehicle, wherein the colorant further comprises a compound selected from the group consisting of In yet other embodiments, there is provided a phase change ink composition comprising: a colorant; a dispersant; and a wax ink vehicle, wherein the colorant further comprises a compound having one or more functional acid groups and a N-alkyl or N-aryl counterion that is quaternary ammonium NH$_4$ or an alkyl or aryl quaternary ammonium selected from the group consisting of tetrabuthylammonium, teraoctylammonium, teradodecylammonium, tetraoctadecylammonium, N,N-dimethyl dioctadecyl, N,N-dimethyl dioctyl, N,N-dimethyl didecyl, and mixtures thereof, and further wherein the colorant is insoluble in water and polar organic solvents but is soluble in the wax ink vehicle.

BRIEF DESCRIPTION OF THE DRAWINGS

For a better understanding of the present embodiments, reference may be had to the accompanying figures.

DETAILED DESCRIPTION

In the following description, it is understood that other embodiments may be utilized and structural and operational changes may be made without departure from the scope of the present embodiments disclosed herein, phase change ink technology broadens printing capability and customer base across many markets, and the diversity of printing applications will be facilitated by effective integration of printhead technology, print process and ink materials. The phase change ink compositions are characterized by being solid at room temperature and molten at an elevated temperature at which the molten ink is applied to a substrate. However, phase change ink systems also experience problems during performance at other temperatures including at jetting temperature. For example, organic pigments and dyes used in phase change inks can exhibit drooling behavior and faceplate staining on the front face of the printhead. Drooling is defined as the burst of the ink out of the printhead whether pressure is applied or not. For purposes of quantifying drool, it is convenient to express drool of a given test ink sample against a non-drooling reference such as the ink base without any colorant and/or dispersant. The relationship below defines the level of drool for a given test ink.

$$\Delta(\text{Drool Pressure}) = \text{Drool Pressure(sample)} - \text{Drool Pressure(reference)}$$

It is desirable to have as small as possible a delta drool pressure of a given ink such that optimum jetting and print performance can be realized.

Drool pressure of a sample ink is the pressure realized that causes the ink to burst out of at least some of the nozzles in the printhead which can be accurately measured by a micropressure gauge. Drooling of inks in a printhead complicate the jetting process due to undesirable inter-nozzle color mixing as well as resulting in the undesirable depletion of ink from the ink loader. Drool pressure of a reference ink is that pressure realized that causes the reference ink to burst out of at least some of the nozzles in the printhead which can be measured by a micropressure gauge. Typically this pressure value satisfies the requirements for successful jetting over the many purge and wipe cleaning cycles that occurs over the lifetime of the printer. Staining of the printhead is the undesirable fouling of the faceplate by an ink, or at least a portion of an ink, which can be qualitatively assessed through visual observation. For example, staining can be seen as ink smeared on the surface of the faceplate. Thus a desirable observation is when little or no ink is observed on the faceplate. A printhead that has been very undesirably compromised by staining from an ink, or a portion of an ink, will likely be more prone to ink drooling at even lower applied pressures during the course of the printer's normal purge and wipe cleaning cycles. In the present embodiments, there is provided a phase change ink composition that has a drool pressure in a printer of at least 1.5 inches water. In further embodiments, the composition has a drool pressure in of from about 1.5 inches of water to about 4.0 inches of water or of from about 2.8 inches of water to about 4.0 inches of water.

Most phase change inks containing pigments have problems with drooling and staining onto the faceplate. One exception are inks containing Pigment Red 176 which exhibited minimal or controllable drool behavior at differential pressures, compared to a commercially available base as a control, from about 0 to about −0.9 inches of water. In contrast, inks with Hostaperm Blue B4G and SOLSPERSE 5000 as a synergist exhibited a $\Delta$LPA of −2.4 inches of water, and inks containing Lyonogen Magenta (Pigment Red 122, with and without synergist) exhibited a $\Delta$LPA of −1.7 inches of water.

Banding of a printed member from an ink is defined as the undesirable non-uniformity of optical density across the page, for example, across a solid fill print. This is typically caused by varying proportions of colorant in an ink, typically pigment particles, that partially settle in the various manifolds of the jetstack over time thus only allowing the remaining clear base and/or ink with less than full color strength to be jetted. Conversely, for the manifolds connected to the nozzles in the opposite configuration, an enrichment of color can result where even nozzle clogging can occur. The level of banding and pattern can depend on the configuration of a given printhead's fluidic channel system. The level or degree of banding can be both qualitatively and quantitatively assessed. The level or degree of banding can be assessed, for example, from the first print out from an ink that has been aging in a printer for a period of time, for example, a day or a week. The level or degree of banding can also be assessed for a series of consecutively formed prints, such as the first 5 or 10 prints, for example, made from an ink that has been aging in a printer for a period of time, for example, a day or a week. The differences in the printed images' optical densities of consecutive prints made from an ink that has been aging in a printer for a period of time can indicate the nature of the micro-settling of the colorant's particles. Inks that are assessed for banding can be printed on any suitable substrate such as coated papers, uncoated papers, transparencies and the like.

A qualitative banding assessment of a print typically is represented by a visual rating system that attempts to define the presence or absence of discreet banding occurrences, it is convenient to use a scale that has 5 or 6 banding rating intervals or up to about 10 banding rating intervals, for example. While a qualitative visual rating system can be both a powerful and useful tool in ranking the banding level of a given print, a quantitative measure of banding allows for a more accurate determination of banding of a print. Also, image analysis tools can be applied to assess scanned prints that can yield accurate information on the jet to jet performance both along and across the print process path.

Quantitative banding assessment can be measured by various colorimeters that directly measure X,Y,Z tristimulus values, densitometers and more desirably by spectrophotometers and spectrodensitometers. Illuminant types can include type A (incandescent), type C (sunlight), type D50 (daylight, red shade), type E (normalized 5500K reference), type D65 (daylight, neutral), type D75 (daylight, blue shade), type F2 (cool white fluorescent), type F7 (broad band white fluorescent), Type F11 (TL84 fluorescent) and type F12 (Ultralume 3000 fluorescent). Suitable optical density responses include ANSI Status T, DIN Status E and ANSI Status A. Useful colorimetric outputs of these devices include, but are not limited to, CIE XYZ, CIE LAB, CIE LUV and CIE LCH conventions.

The presence of banding of an image on a print can be detected by measuring optical density normal to the print process direction for at least one location on the print. It is useful to assess banding from prints having a 100% density solid fill target which serves to minimize the measured contributions of visible paper from lower fill densities and thus result in a more accurate measure of the degree of banding. It is convenient to express the uniformity of density across the page (that is the direction that is normal to the print process direction) as a percentage deviation from the mean optical density where it is desirable for a given print to have as low a percentage deviation from the mean optical density as possible. The coefficient of variation of measured optical densities of a print, herein denoted as banding CV, is defined as the measured optical densities' standard deviation divided by the mean optical density multiplied by 100% where it is also desirable for a given print to have as low a banding CV as possible.

It is desirable for a print to have a banding CV no higher than about 6%, such as no higher than about 4% and such as no higher than about 2%.

A synergist or a pigment stabilizer is a compound that promotes the adsorption of the polymeric dispersant onto the pigment. For example, in the case of a cationic dispersant, the dispersant anchor is comprised of a positive charge and will interact with an anionic group present on the synergist, exchanging counter ions and promote an anchoring of the dispersant onto the modified pigment surface. For example, in embodiments, synergists having sulfonic groups, such as that are in Solsperse 22000, are absorbed onto the pigment. The sulfonic end groups of the synergist and the quaternary ammonium end groups of the dispersants interact, exchanging counter ions and promoting an anchoring of the dispersant onto the modified pigment surface.

The present embodiments address drooling and faceplate staining by using a specific type of colorant in the phase change inks. Commercially available colorants cannot, however, be used because such colorants exhibit a strong gelling behavior in phase change ink. For example, inks prepared with commercially available active polymeric synergist agents SOLSPERSE 5000 (a derivatized sulfonated copper phthalocyanine) and SOLSPERSE 22000 (a derivatized sulfonated Pigment Yellow 12) at nominal ink loadings below 1% by weight (with no pigment added for the purposes of exploring the concept of the synergist itself being a colorant) exhibited no drooling or staining behavior. However, when the synergist loading was increased to or above 2.5% wt (with no pigment added for the purposes of exploring the concept of the synergist itself being a colorant) the inks displayed strong gelling behavior. Since commercially available synergists cannot be used as colorants, the present embodiments are directed to compounds containing acid functional groups that can be domesticated as phase change ink colorants.

As such, the present embodiments provide an acid colorant that can be used in phase change inks and which addresses the problems described above. An acid colorant is a compound that contains functional acid groups and is soluble in water. The colorant must be modified by replacing the metal counterion with a more suitable N-alky/aryl counterion which will facilitate compatibility with phase change ink. Phase change inks prepared with the acid colorants of the present embodiments were tested for drooling, staining and banding in a Typhoon printer. All tested inks demonstrated non-drooling and non-staining behavior and passed a 72-hour banding test at 118° C. As such, the acid colorant of the present embodiments offers major advantages over previously used colorants by preventing or reducing undesirable drooling and staining behavior, thus improving stability of the ink in the printhead, and also allows for the opportunity to use cheaper commercial dyes that could be modified for improved performance in a phase change ink jet printhead.

Acid dyes are compounds in which the coloring component is in the anion, and such dyes are usually sold as sodium salts of the corresponding acid functionality ($COO^-$ or $SO_3^-$). Because these off the shelf colorants exhibit a strong gelling behavior in phase change ink, the colorants must be modified by replacing the metal counterion with a more suitable N-alkyl/aryl counterion which will allow much improved compatibility with phase change ink components. Suitable N-alkyl/aryl counterions to be used in the modification may be selected from the group consisting of quaternary ammonium $NH_4$, or any alkyl or aryl quaternary ammonium, such as tetrabuthylammonium, teraoctylammonium, teradodecylammonium, tetraoctadecylammonium, N,N-dimethyl dioctadecyl, N,N-dimethyl dioctyl, N,N-dimethyl didecyl, quaternary ammonium compounds known as the Arquads, and mixtures thereof.

The quaternary ammonium compounds known as the Arquads are primarily alkyltrimethylammonium chlorides and may be represented by the formula R—$N(CH_3)_3Cl$ wherein R is a long chain alkyl group having at least 8 carbon atoms. These particular quaternary ammonium compounds are marketed by Akzo Nobel N.V. under the trade-name ARQUAD. A variety of compounds of this class are available varying as to the length and number of long chain alkyl groups attached to the nitrogen atom.

Figure 1:
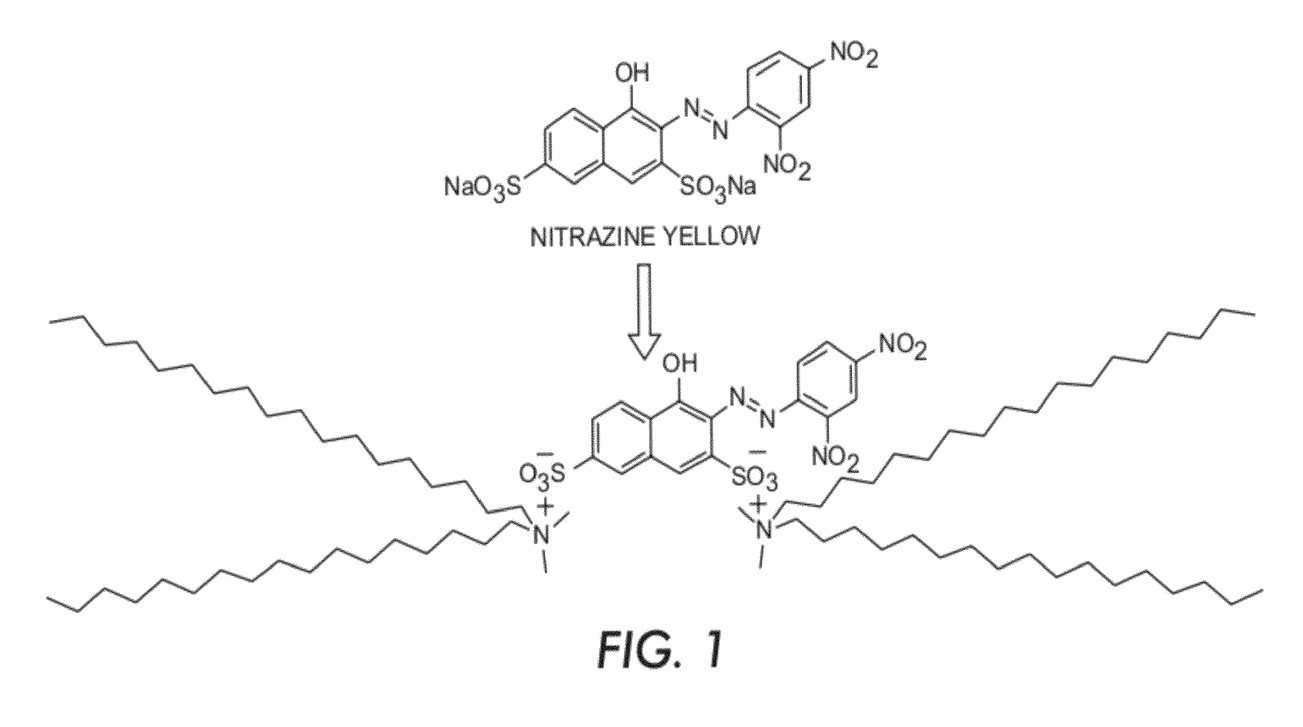
FIG. 1 illustrates an example of a domesticated acid dyes according to the present embodiments.
Figure 2:
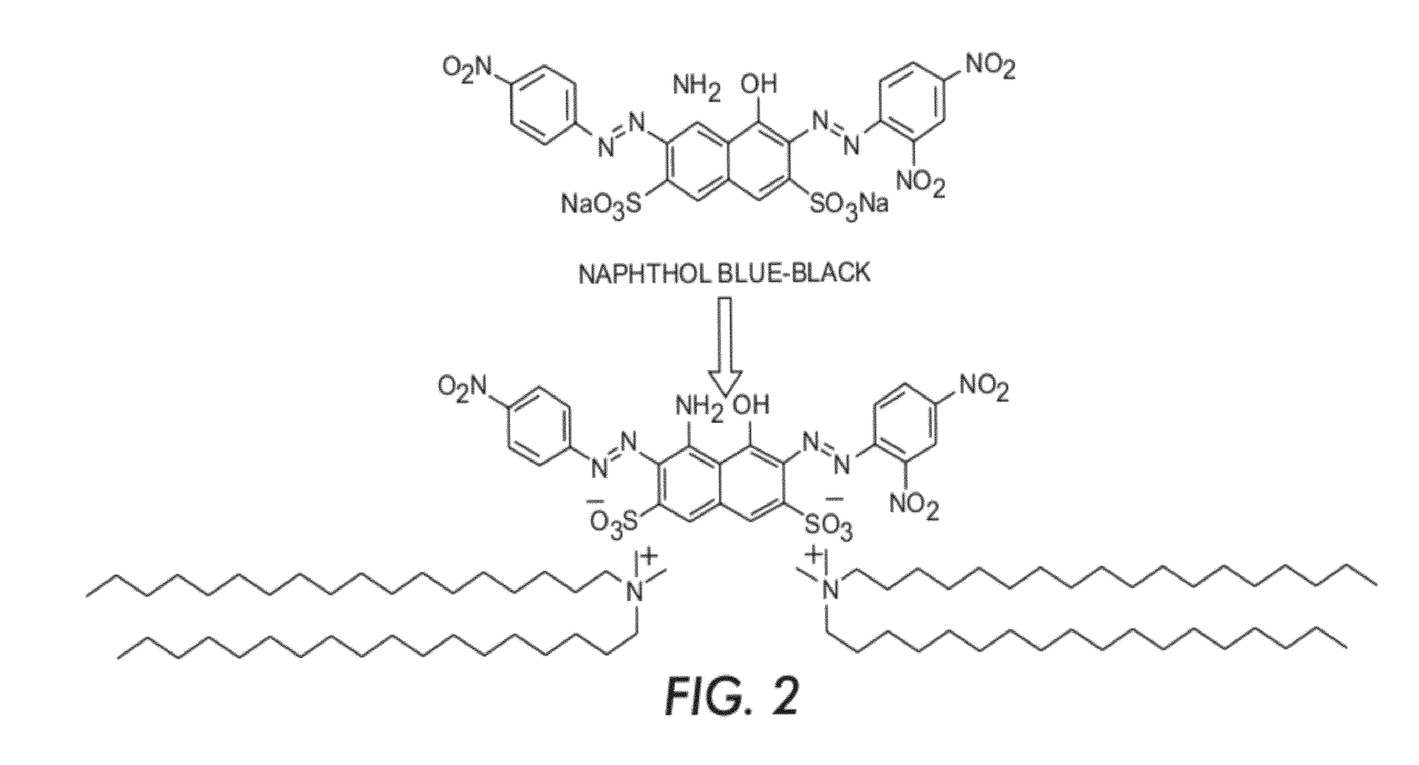
FIG. 2 illustrates another example of a domesticated acid dyes according to the present embodiments.

FIGS. 1 and 2 present two examples of domesticated acid dyes: Naphthol Blue-Black and Nitrazine Yellow. The displacement of the metal by the N-alkyl counterion modifies the solubility parameters of the compound from being soluble in water and polar organic solvents to being insoluble in most solvents while being readily dispersible in the waxy vehicle of phase change ink. Any dye or pigment that can be modified by replacing the metal counterion with a more suitable N-alkyl/aryl counterion to allow improved compatibility with phase change ink components may be used as the acid colorants of the present embodiments. In embodiments, such dyes and pigments include, but are not limited to, those containing at least one carboxylic acid or at least one sulfonic acid group, and mixtures thereof. Dispersants used in the phase change inks include, but are not limited to, those selected from the group consisting of MODAFLOW 2100, available from Cytec Surface Specialties, OLOA 1200, OLOA 11000, OLOA 11001, available from Chevron Oronite Company LLC, IRKASPERSE 2153, 2155, SOLSPERSE 9000, 16000, 17000, 17940, 18000, 19000, 19240, 20000, 36000, 39000, 41000, 54000, available from Lubrizol Corporation) and mixtures thereof. Exemplary ink compositions may include one or more dispersants and/or one or more surfactants for their known properties, such as controlling wetting properties of the ink composition, and stabilizing pigmented colorants.

The acid colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink. The dispersant may be present in the phase change ink in an amount of from about 0.1 to about 25 percent by weight of the total weight of the ink. In further embodiments, the dispersant may be present in the phase change ink in an amount of from about 0.5 to about 10, or from about 1 to about 6 percent by weight of the total weight of the ink.

The ink of the present embodiments may further include conventional additives to take advantage of the known functionality associated with such conventional additives. Such additives may include, for example, at least one isocyanate derived material, antioxidant, defoamer, slip and leveling agents, clarifier, viscosity modifier, adhesive, plasticizer and the like.

The ink vehicle or carrier may also include at least one isocyanate derived material. The isocyanate derived material may be a urethane resin obtained by reacting two equivalents of an alcohol, such as hydroabietyl alcohol and one equivalent of an isocyanate or diisocyanate (isophorone diisocyanate), as disclosed in, for example, Example 1 of U.S. Pat. No. 5,782,966, the disclosure of which is totally incorporated herein by reference in its entirety. The isocyanate derived material may be present in the ink carrier in an amount of from about 2 to about 99 percent or from about 2 to about 90 percent or from about 3 to about 80 percent by weight of the ink carrier. Other suitable isocyanate-derived materials include a urethane resin that was the adduct of three equivalents of stearyl isocyanate and a glycerol-based alcohol, prepared as described in Example 4 of U.S. Pat. No. 6,309,453, the disclosure of which is totally incorporated herein by reference in its entirety.

The ink may optionally contain antioxidants to protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba Inc.), (2) 2,2-bis(4-(2-(3,5-di-tert-butyl-4-hydroxyhydrocinnamoyloxy)) ethoxyphenyl)propane (TOPANOL-205, available from ICI America Corporation), (3) tris(4-tert-butyl-3-hydroxy-2,6-dimethyl benzyl)isocyanurate (CYANOX 1790, 41, 322-4, LTDP, Aldrich D12,840-6), (4) 2,2'-ethylidene bis(4,6-di-tert-butylphenyl)fluoro phosphonite (ETHANOX-398, available from Ethyl Corporation), (5) tetrakis(2,4-di-tert-butylphenyl)-4,4'-biphenyl diphosphonite (ALDRICH 46,852-5; hardness value 90), (6) pentaerythritol tetrastearate (TCI America #P0739), (7) tributylammonium hypophosphite (Aldrich 42,009-3), (8) 2,6-di-tert-butyl-4-methoxyphenol (Aldrich 25,106-2), (9) 2,4-di-tert-butyl-6-(4-methoxybenzyl)phenol (Aldrich 23,008-1), (10) 4-bromo-2,6-dimethylphenol (Aldrich 34,951-8), (11) 4-bromo-3,5-didimethylphenol (Aldrich B6,420-2), (12) 4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich 1014,400-2), (15) 2-amino-4-tert-amylphenol (Aldrich 41,258-9), (16) 2,6-bis (hydroxymethyl)-p-cresol (Aldrich 22,752-8), (17) 2,2'-methylenediphenol (Aldrich B4,680-8), (18) 5-(diethylamino)-2-nitrosophenol (Aldrich 26,951-4), (19) 2,6-dichloro-4-fluorophenol (Aldrich 28,435-1), (20) 2,6-dibromo fluoro phenol (Aldrich 26,003-7), (21) α-trifluoro-o-creso-1 (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-tri-fluoroethyl sulfone (Aldrich 13,823-1), (25) 3,4-difluoro phenylacetic acid (Adrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5-bis (trifluoromethyl) benzoic acid (Aldrich 32,527-9), (30) ethyl-2-(4-(4-(trifluoromethyl)phenoxy)phenoxy)propionate (Aldrich 25,074-0), (31) tetrakis (2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

The ink may further contain an optional viscosity modifier such as FORAL 85, a glycerol ester of hydrogenated abietic (rosin) acid (commercially available from Eastman), FORAL 105, a pentaerythritol ester of hydroabietic (rosin) acid (commercially available from Eastman), CELLOLYN 21, a hydroabietic (rosin) alcohol ester of phthalic acid (commercially available from Eastman), ARAKAWA KE-311 and KE-100 Resins, triglycerides of hydrogenated abietic (rosin) acid (commercially available from Arakawa Chemical Industries, Ltd.), synthetic polyterpene resins such as NEVTAC 2300, NEVTAC 100, and NEVTACO 80 (commercially available from Neville Chemical Company), WINGTACK 86, a modified synthetic polyterpene resin (commercially available from Sartomer), and the like. Viscosity modifiers may be present in the ink in any effective amount, such as from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

Adhesives, such as VERSAMID 757, 759, or 744 (commercially available from Cognis) may be present in the ink from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

Plasticizers such as UNIPLEX 250 (commercially available from Unitex), the phthalate ester plasticizers commercially available from Ferro under the trade name SANTICIZER, such as dioctyl phthalate, diundecyl phthalate, alkylbenzyl phthalate (SANTICIZER 278), triphenyl phosphate (commercially available from Ferro), KP-140, a tributoxyethyl phosphate (commercially available from Great Lakes Chemical Corporation), MORFLEX 150, a dicyclohexyl phthalate (commercially available from Morflex Chemical Company Inc.), trioctyl trimellitate (commercially available from Sigma Aldrich Co.), and the like. Plasticizers may be present in an amount from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

When present, the optional additives may each, or in combination, be present in the ink in any desired or effective amount, such as from about 1 percent to about 10 percent by weight of the ink or from about 3 percent to about 5 percent by weight of the ink.

In embodiments, the ink carriers for the phase change inks may have melting points of from about 60° C. to about 150° C., for example from about 80° C. to about 120° C., from about 85° C. to about 110° C., from about 100° C. to about 110° C., or from about 105° C. to about 110° C. as determined by, for example, observation and measurement on a microscope hot stage, wherein the binder material is heated on a glass slide and observed by microscope. Higher melting points are also acceptable, although printhead life may be reduced at temperatures higher than 150° C. Furthermore, low energy inks have a jetting viscosity of about 9 cP to about 13 cP, such as from about 10 cP to about 11 cP, from about 10.25 cP to about 10.75 cP or from about 10.45 cP to about 10.85 cP, at melting points of about 107° C. to about 111° C.

The ink compositions can be prepared by any desired or suitable method. For example, each of the components of the ink carrier can be mixed together, followed by heating, the mixture to at least its melting point, for example from about 60° C. to about 150° C., 80° C. to about 120° C. and 85° C. to about 110° C. The colorant may be added before the ink ingredients have been heated or after the ink ingredients have been heated. When pigments are the selected colorants, the molten mixture may be subjected to grinding in an attritor or ball mill apparatus to effect dispersion of the pigment in the ink carrier. The heated mixture is then stirred for about 5 seconds to about 10 minutes or more, to obtain a substantially homogeneous, uniform melt, followed by cooling the ink to ambient temperature (typically from about 20° C. to about 25° C.). The inks are solid at ambient temperature. In a specific embodiment, during the formation process, the inks in their molten state are poured into molds and then allowed to cool and solidify to form ink sticks. Suitable ink preparation techniques are disclosed in U.S. Pat. No. 7,186,762, the disclosure of which is incorporated herein by reference in its entirety.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto, a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Comparative Example 1

Preparation of Phase Change Ink containing Non-modified Naphthol Blue-Black

In a 600 mL beaker, the following were added: 26.7 g KEMAMIDE S-180 (a stearyl stearamide) commercially available from Crompton Corporation, 18.72 g of a triamide wax (triamide as described in U.S. Pat. No. 6,860,930), 80.69 g polywax (a polyethylene wax having an average peak molecular weight of from about 350 to about 730 grams per mole, a polydispersity of from about 1.03 to about 3.0, and an asymmetrical molecular weight distribution skewed toward the high molecular weight end, as described in U.S. Pat. No. 7,407,539) from Baker Petrolite, 18.72 g KE-100 resin commercially available from Arakawa Corporation, 1.6 parts of a urethane resin that is the adduct of three equivalents of stearyl isocyanate and a glycerol-based alcohol (prepared as described in Example 4 of U.S. Pat. No. 6,309,453), 0.2 parts Naugard-445 (an antioxidant) available from Crompton Corp and 8 g SOLSPERSE 17000 commercially available from Lubrizol Corporation.

The materials were melted in an oven at 120° C., then transferred to a Union Process 01 attritor, available from Union Process, that was also heated to 120° C., and charged with 1800 g 440 C type ⅛ inch diameter stainless steel balls available from Hoover Precision Products. A heated impeller was attached to the assembly. To this mixture were slowly added 4.8 g of Naphthol Blue-Black. The impeller speed was increased such that the impeller's peripheral velocity was about 150 centimeters per second whereupon the attrition was continued for 18 hours. After the removal of the steel shot by sieving, the resulted ink formed a strong gel and could not be assessed by filtration.

Examples 1 and 2

Preparation of the Phase Change Ink of the Present Embodiments

The colorants (Naphthol Blue-Black, Nitrazine Yellow) and N,N-dimethyldioctadecyl bromide were purchased from Sigma Aldrich. Compounds of modified Naphthol Blue-Black and Nitrazine. Yellow were prepared by reacting the commercially available colorant with N,N-dimethyldioctadecyl bromide in a 1:2 ratio colorant to ammonium bromide. The reaction proceeded very fast in water at 80° C., and the resultant insoluble compounds were isolated by filtration using a glass frit.

Example 1

Preparation of Phase Change Ink 1 containing Modified Naphthol Blue-Black

In a 600 mL beaker, the following were added: 26.7 g KEMAMIDE S-180 (a stearyl stearamide) commercially available from Crompton Corporation, 18.72 g of a triamide wax (triamide as described in U.S. Pat. No. 6,860,930), 80.69 g polywax (a polyethylene wax having an average peak molecular weight of from about 350 to about 730 grams per mole, a polydispersity of from about 1.03 to about 3.0, and an asymmetrical molecular weight distribution skewed toward the high molecular weight end, as described in U.S. Pat. No. 7,407,539) from Baker Petrolite, 18.72 g KE-100 resin commercially available from Arakawa Corporation, 2.56 g of a urethane resin that is the adduct of three equivalents of stearyl isocyanate and a glycerol-based alcohol (prepared as described in Example 4 of U.S. Pat. No. 6,309,453), 0.2 parts Naugard-445 (an antioxidant) available from Crompton Corp and 8 g SOLSPERSE 17000 commercially available from Lubrizol Corporation.

The materials were melted in an oven at 120° C., then transferred to a Union Process 01 attritor, available from Union Process, that was also heated to 120° C., and charged with 1800 g 440 C type ⅛ inch diameter stainless steel balls available from Hoover Precision Products. A heated impeller was attached to the assembly. To this mixture were slowly added 4.8 g of compound modified Naphthol Blue-Black. The impeller speed was increased such that the impeller's peripheral velocity was about 150 centimeters per second whereupon the attrition was continued for 18 hours such that the stainless steel balls at the top of the vessel began to tumble gently over each other. The resultant ink was obtained after removing the steel shot by sieving and then filtered past a 5 micron stainless steel mesh filter available from Gerard Daniel Worldwide. The ink, as measured in frequency mode by a Rheometrics RFS-3 rheometer, fitted with cone and plate geometry, had a complex viscosity of 13.6 cP at 115 C.

Example 2

Preparation of Phase Change Ink 2 containing Modified Nitrazine Yellow

In a 1000 mL beaker, the following were added: 53.4 g KEMAMIDE S-180 (a stearyl stearamide) commercially available from Crompton Corporation, 37.44 g of a triamide wax (triamide as described in U.S. Pat. No. 6,860,930), 161.38 g polywax (a polyethylene wax having an average peak molecular weight of from about 350 to about 730 grams per mole, a polydispersity of from about 1.03 to about 3.0, and an asymmetrical molecular weight distribution skewed toward the high molecular weight end, as described in U.S. Pat. No. 7,407,539) from Baker Petrolite, 18.72 g KE-100 resin commercially available from Arakawa Corporation, 5.12 g of a urethane resin that is the adduct of three equivalents of stearyl isocyanate and a glycerol-based alcohol (prepared as described in Example 4 of U.S. Pat. No. 6,309,453), 0.2 parts Naugard-445 (an antioxidant) available from Crompton Corp and 16 g SOLSPERSE 17000 commercially available from Lubrizol Corporation.

The materials were melted in an oven at 120° C., then transferred to a Union Process 01 attritor, available from Union Process, that was also heated to 120° C., and charged with 1800 g 440 C type ⅛ inch diameter stainless steel balls available from Hoover Precision Products. A heated impeller was attached to the assembly. To this mixture were slowly added 12 g of compound modified Nitrazine Yellow. The impeller speed was increased such that the impeller's peripheral velocity was about 150 centimeters per second whereupon the attrition was continued for 18 hours such that the stainless steel balls at the top of the vessel began to tumble gently over each other. The resultant ink was obtained after removing the steel shot by sieving and then filtered past a 5 micron stainless steel mesh filter available from Gerard Daniel Worldwide. The ink, as measured in frequency mode by a Rheometrics RFS-3 rheometer, fitted with cone and plate geometry, had a complex viscosity of 10.2 cP at 115 C.

Comparative Example 2

An ink was formed similarly to that in Example 1 except that the colorant was a Pigment Red 176, available from Clariant Corporation. The pigmented ink was dispersed with the aid of a pigment synergist, SOLSPERSE 22000, available from Lubrizol Corporation.

Comparative Example 3

An ink was formed similarly to that in Example 1 except that the colorant was a Pigment Red 122, available from Toyo Ink. The pigmented ink of this comparative example was dispersed with the aid of a custom quinacridone synergist (Q-syn-1), having the following structure:

wherein n is 1-4, X is any metal, alkyl or aryl quaternary ammonium, and $R_1$, $R_2$, $R_3$ and $R_4$ are either the same or different and each is H, $CH_3$, $OCH_3$ or Cl.

Comparative Example 4

An ink was formed similarly to that in Example 1 except that the colorant was a Pigment Red 185, available from Clariant Corporation. The pigmented ink was dispersed with the aid of a pigment synergist, SOLSPERSE 22000, available from Lubrizol Corporation.

Print Testing Results

Drool and Staining

As stated previously, drooling of an ink is an undesirable phenomenon that caused when an uncontrollable and unyielding quantity of ink continues to flow through a given print head's nozzles after nullification of an applied pressure during a purge cycle: Staining, also an undesirable phenomenon, is all or a portion of the latent ink that remains on the print head even after several purge/wipe cycles. To assess a test ink's resistance to drooling, the ink was tested in a print head. After the test was completed, the print head was cleaned thoroughly by flushing with ink base.

Applied pressures that resulted in the drooling of the reference ink base were measured and ranged from 2.1 to 2.8 inches of water, as measured by a pressure gauge. These values were somewhat dependent on the history of testing done on various printheads, nevertheless, all of the reference ink bases drooled above the minimum desired applied pressure criterion of about 1.5 inches of water. In the examples, drool pressure was measured with a model number DPIS8 pressure transducer available from Omega Engineering, Inc. (Stamford, Conn.) and calibrated against a manometer. However, other types of pressure transducers may also be used to measure drool pressure.

The drool pressure threshold of a given test ink was determined by first applying the pressure at the range used for the ink base. If drooling was observed, the drooling pressure threshold of that test ink would be determined by applying graduated decreases in pressure. The delta drool pressure of a given test ink was also calculated by the difference of the measured drool pressure thresholds of the reference ink base and the test ink sample.

Δ(Drool Pressure)=Drool Pressure(sample)−Drool Pressure(reference)

Thus a test ink having a drool pressure of negative differential inches of water, relative to a commercially available base (serving as a control), drooled at a lower applied pressure that was typically used in the printer. Table 1 presents the results of the drool and staining tests.

Banding

Banding of a pigmented ink, an undesirable print feature, manifests itself as discreet and varying optical density across the printed page. The main reason for this occurrence is due to various levels of pigment particles that settle in the printhead as the pigmented ink is aged over time. Banding assessment of a test ink is employed to provide preliminary information about print head stability of that ink.

The banding test consists of keeping an ink in the printhead at 118° C. for 72 hours in a print head. The print head initially is flushed thoroughly with clear ink base to eliminate all or at least the vast majority of the previous test ink to eliminate or at least minimize the unwanted prospect of cross contamination between inks. Upon loading the test ink in the printer a full 100% density solid print is made on a suitable substrate. In this case, Xerox Digital Color Xpressions Plus Copy paper is used, and compared to the print, made from the same target onto the same paper taken at the end of the test at which point the test ink would have been aged in the printer for a period of time, such as 3 days at 118° C. A suitable measure of the densometric consistency of a solid fill is optical density, and can be determined by measuring it at discreet intervals; such as for this series of measurements in 1 millimeter intervals. For a measure of consistent optical density across the page (e.g., normal to the print process direction), the percentage standard deviation of the measured optical densities should be as low as possible. The mean optical density of the print image is defined as the arithmetic mean of the various individual optical densities measured across the printed page, as calculated from:

$$\bar{x} = \frac{1}{n}\sum_{i=1}^{n} x_i$$

such that $\bar{x}$ is the average of measured optical densities, i is an individual optical density measurement position, $x_i$ is an individual optical density measurement result and n is the number of optical density measurements made. The measured optical densities' standard deviation, as an unbiased estimator, is calculated from:

$$s = \sqrt{\frac{1}{N-1}\sum_{i=1}^{N}(x_i - \bar{x})^2},$$

such that s is the measured optical densities' standard deviation, $\bar{x}$ is the average of measured optical densities, i is an individual optical density measurement position, $x_i$ is an individual optical density measurement result and N is the number of optical density measurements made. The coefficient of variation of the measured optical densities, or banding CV, is thus calculated from:

Banding $CV = s/\bar{x} * 100\%$

The optical densities of the prints were measured under ambient conditions by a GretagMacBeth ColorEye® 7000A spectrophotometer, D50 illuminant, 2° observer and ANSI Status A response. In the absence of banding of an ink, there should also ideally be no visually discernable differences between the two prints.

TABLE 1

| Test | Comparative Example 2 | Comparative Example 3 | Comparative Example 4 | Example 1 | Example 2 |
|---|---|---|---|---|---|
| | | | Ink | | |
| Novel Colorant Preparation | n/a | n/a | n/a | Modified Naphthol Blue-Black | Modified Nitrazine Yellow |
| Δ (Drool Pressure) (inches of water) | −1.04 | −1.78 | −1.60 | −0.60 | −0.50 |
| Drool Pressure (inches of water) | 1.16 | 0.33 | 1.20 | 1.56 | 1.61 |
| Relative % Drool Pressure Difference from Ink Base | −47.4 | −84.5 | −57.1 | −27.8 | −23.7 |
| Staining (visual observation) | No | Medium staining | No | No | No |
| Banding CV at initial state (%) | Not tested | Not tested | 3.4 | 1.7 | 1.7 |
| Time ink aged in Printer at 118° C. (hours) | Not tested | Not tested | 17 | 72 | 72 |
| Banding CV of first print from ink aging test (%) | Not tested | Not tested | 15.0 | 4.5 | 6.4 |
| Visual banding differences between initial print of unaged ink and first print of aged ink | Not tested | Not tested | Very large difference | Very slight difference | Very slight difference |

Figure 3A:
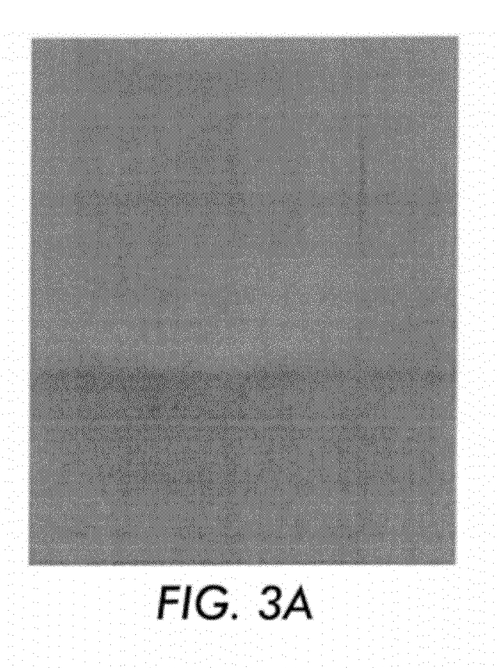
FIG. 3A demonstrates a banding test page at the initial state of a jettable phase change ink immediately after being loaded into the printer according to the present embodiments.
Figure 3B:
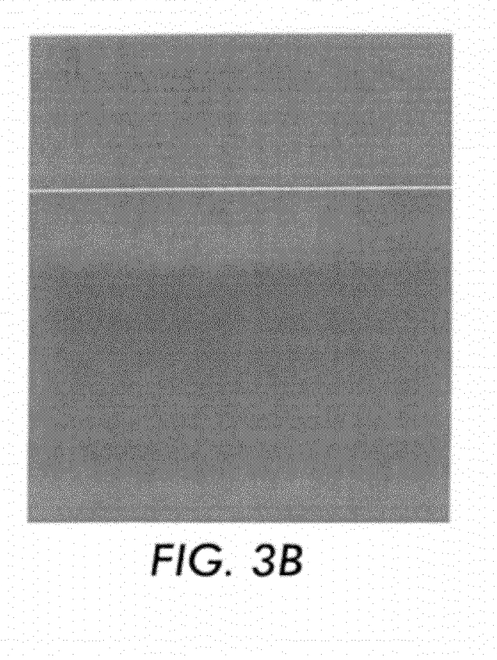
FIG. 3B demonstrates a banding test page after 3 days in a printer for the phase change ink of FIG. 3A.
Figure 4A:
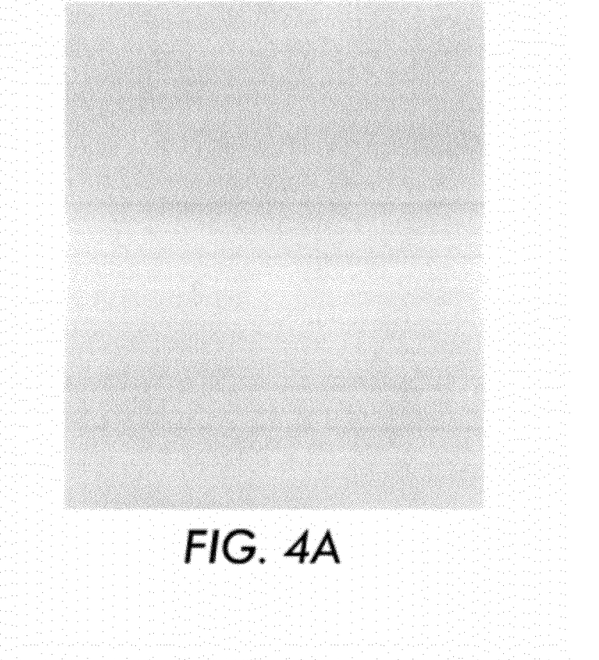
FIG. 4A demonstrates a banding test page at Day 0 for another phase change ink according to the present embodiments.
Figure 4B:
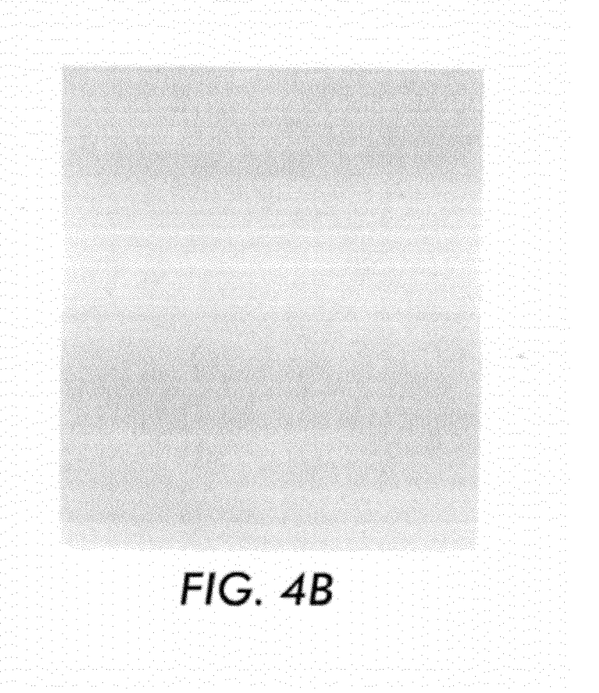
FIG. 4B demonstrates a banding test page at Day 3 for the phase change ink of FIG. 4A.

FIG. 3A and FIG. 3B demonstrate a banding test page for Ink 1 in Example 1 at Day 0 (FIG. 3A) and after 3 days (FIG. 3B) at 118° C. FIG. 3B shows the first print out after the 3 day banding test demonstrating good stability of the non-optimized ink as the vast majority of print head nozzles fired yielding reasonably uniform optical density across the print. FIG. 4A and FIG. 4B demonstrate a banding test page for Ink 2 in Example 2 at Day 0 (FIG. 4A) and after 3 days (FIG. 4B) at 118° C. FIG. 4B shows the first print out after 3 day banding test demonstrating the good stability of the ink as all of the print head nozzles fired yielding reasonably uniform optical density across the print.

Figure 5A:
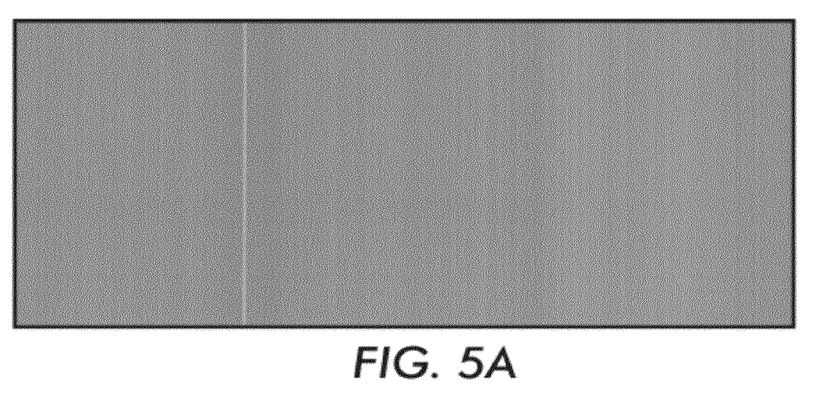
FIG. 5A demonstrates a banding test page at Day 0 for a comparative phase change ink.
Figure 5B:
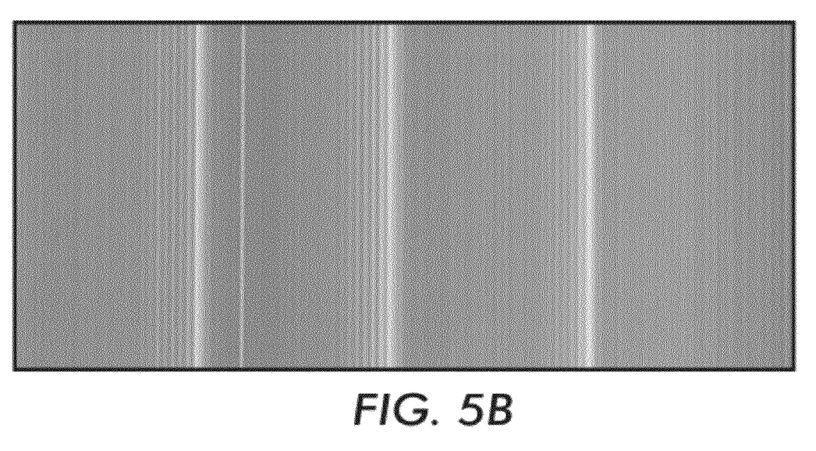
FIG. 5B demonstrates a banding test page at Hour 17 for the phase change ink of FIG. 5A.

FIG. 5A and FIG. 5B demonstrate a banding test page for Ink 3 in Comparative Example 4 at Day 0 (FIG. 5A) and after only 17 hours (FIG. 5B) at 118° C. FIG. 5B shows the first print out after a 17 hour banding test demonstrating the poor stability of the ink as several of the print head nozzles did not fire and/or fired with a low or no amount of colorant present indicating the settling of pigment particles had occurred during the aging of the ink in the printhead at 118° C.

Table 1 summarizes the banding results and shows the best banding results are those that have the overall lowest variable optical density across the printed page.

SUMMARY

In summary, the present embodiments provide for novel colorants for use in phase change ink compositions. The novel colorants of the present embodiments are prepared from various acid dyes derivatized with, as an example, N,N-dimethyldioctadecyl bromide. The novel colorants require relatively low energy input to be incorporated into phase change ink components as inks, and are compatible with the phase change ink components. Phase change inks comprising the novel colorants exhibit improved drool resistance and resistance to faceplate staining as compared to conventional pigmented inks. In addition, the phase change inks comprising these colorants demonstrated good stability against banding in a printer for 3 days at 118° C.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A phase change ink composition comprising:

a colorant; and a wax ink vehicle, wherein the colorant further comprises a compound selected from the group consisting of -continued and and the colorant is insoluble in water and polar organic solvents but is soluble in the wax ink vehicle.

2. The phase change ink composition of claim 1 having a drool pressure in a printer of at least 1.5 inches water.

3. The phase change ink composition of claim 2 having a drool pressure in a printer of from about 1.5 inches of water to about 4.0 inches of water.

4. The phase change ink composition of claim 3 having a drool pressure in a printer of from about 2.8 inches of water to about 4.0 inches of water.

5. The phase change ink composition of claim 1 exhibiting little to no staining through visual observation.

6. The phase change ink composition of claim 1, wherein the colorant is present in the phase change ink composition in an amount of from about 0.1 to about 50 percent by weight of the total weight of the phase change ink composition.

7. The phase change ink composition of claim 6, wherein the colorant is present in the phase change ink composition in an amount of from about 0.2 to about 20 percent by weight of the total weight of the phase change ink composition.

8. The phase change ink composition of claim 7, wherein the colorant is present in the phase change ink composition in an amount of from about 0.5 to about 10 percent by weight of the total weight of the phase change ink composition.

9. The phase change ink composition of claim 1 further comprising a dispersant selected from the group consisting of polyethyleneimines, polymers containing quaternary ammonium salts, polymers containing polyalkylated succinimides, and mixtures thereof.

10. The phase change ink composition of claim 1, wherein the dispersant is present in the phase change ink composition in an amount of from about 0.1 to about 25 percent by weight of the total weight of the phase change ink composition.

11. The phase change ink composition of claim 10, wherein the dispersant is present in the phase change ink composition in an amount of from about 0.5 to about 10 percent by weight of the total weight of the phase change ink composition.

12. The phase change ink composition of claim 11, wherein the dispersant is present in the phase change ink composition in an amount of from about 1 to about 6 percent by weight of the total weight of the phase change ink composition.

13. The phase change ink composition of claim 1 exhibiting less Δ(Drool Pressure) than that of a phase change ink composition without the colorant.

14. The phase change ink composition of claim 1 exhibiting no banding.

15. The phase change ink composition of claim 1 exhibiting uniform optical density when printed wherein the coefficient of variation of measured optical densities is less than about 6%.

16. A phase change ink composition comprising:
a colorant; and
an ink vehicle, wherein the colorant further comprises a compound selected from the group consisting of and

-continued

17. A phase change ink composition comprising:
a colorant;
a dispersant; and
a wax ink vehicle, wherein the colorant further comprises a compound selected from the group consisting of

21

22 and further wherein the colorant is insoluble in water and polar organic solvents but is soluble in the wax ink vehicle.

* * * * *

UNITED STATES PATENT AND TRADEMARK OFFICE
CERTIFICATE OF CORRECTION

PATENT NO. : 8,273,166 B2  Page 1 of 2
APPLICATION NO. : 13/008783
DATED : September 25, 2012
INVENTOR(S) : Maria Birau et al.

It is certified that error appears in the above-identified patent and that said Letters Patent is hereby corrected as shown below:

In the drawings, replace Figure 2 with the corrected Figure 2 on the attached sheet In the specification, at columns 1-2 and in claim 1, column 16 and 17, replace:

with:

Signed and Sealed this
Twenty-fourth Day of November, 2015

Michelle K. Lee
*Director of the United States Patent and Trademark Office*

FIG. 2